United States Patent [19]

Mellors

[11] 4,216,279
[45] Aug. 5, 1980

[54] MANGANESE DIOXIDE FLUORIDE-CONTAINING CATHODES FOR SOLID ELECTROLYTE CELLS

[75] Inventor: Geoffrey W. Mellors, North Royalton, Ohio

[73] Assignee: Union Carbide Corporation, New York, N.Y.

[21] Appl. No.: 25,661

[22] Filed: Mar. 30, 1979

[51] Int. Cl.$^2$ .................................................. H01M 6/18
[52] U.S. Cl. ...................................... 429/191; 252/182.1
[58] Field of Search ........................... 429/191, 224; 252/182.1

[56] References Cited

U.S. PATENT DOCUMENTS

| | | |
|---|---|---|
| 3,455,742 | 7/1969 | Rao . |
| 3,778,310 | 12/1973 | Garth . |
| 4,071,655 | 1/1978 | Garth . |
| 4,079,174 | 3/1978 | Beck et al. ............... 429/224 |

*Primary Examiner*—Donald L. Walton
*Attorney, Agent, or Firm*—Cornelius F. O'Brien

[57] ABSTRACT

A cathode for use in solid electrolyte cells comprising a mixture of water-containing manganese dioxide and a metal fluoride.

13 Claims, No Drawings

MANGANESE DIOXIDE FLUORIDE-CONTAINING CATHODES FOR SOLID ELECTROLYTE CELLS

FIELD OF THE INVENTION

The invention relates to a cathode for use in solid state electrolyte cell systems in which the cathode comprises a mixture of manganese dioxide with a metal fluoride.

BACKGROUND OF THE INVENTION

Ionic conductivity is usually associated with the flow of ions through an aqueous solution of metallic salts. In the vast majority of practical uses of ionic conductors, e.g., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm.$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Solid electrolytes must be essentially electronic insulators so as not to internally short the cell while at the same time they must allow ionic movement in the crystal lattice for the cell to operate. It has been discovered that certain metallic salts which are solids at room temperatures have ionic conductances sufficiently high to permit their use in practical battery applications. For example, U.S. Pat. No. 3,723,185 discloses solid state electrolytes of compounds conforming to the general formula AgI-MCN-AgCN or modifications thereof wherein M is potassium, rubidium, cesium or mixtures thereof.

U.S. application Ser. No. 973,554 filed Dec. 27, 1978 titled Solid State Electrolyte, discloses a relatively highly conducting solid state electrolyte made from a binary mixture of lead fluoride and a 0.1 to 15.0 mole percent of a selected alkali salt of sodium, potassium, rubidium and cesium. U.S. application Ser. No. 973,552 filed Dec. 27, 1978 titled Solid State Electrolytes discloses a relatively highly conducting solid state electrolyte of a product of a fused ternary mixture of lead fluoride, an alkali salt of sodium, potassium, rubidium or cesium in a range of 0.1 to 15.0 mole percent and a fluoride, nitrate or sulfate of magnesium, calcium, strontium or barium in a range of between 1 and 40 mole percent. Both of these U.S. applications are incorporated herein by reference.

Although various solid cathode materials are recited in the art for use in various cell systems, an object of the present invention is to provide a novel cathode for use in solid electrolyte cell systems employing solid electrolytes such as those disclosed in the above-identified U.S. patent applications Ser. No. 973,552 and No. 973,554.

Another object of the present invention is to provide a solid cathode for use with a solid fluoride-containing electrolyte wherein said cathode comprises a mixture of manganese dioxide and a metal fluoride.

Another object of the present invention is to provide a cathode consisting essentially of manganese dioxide and a metal fluoride for use in a lead flouride-containing solid electrolyte system, and wherein the open circuit voltage of the system is higher than the open circuit voltage obtained using either manganese dioxide or a metal fluoride alone as the cathode in the system.

Another object of the present invention is to provide a cathode consisting of manganese dioxide and a metal fluoride for use in a solid electrolyte cell employing a lead anode and a lead fluoride-based solid electrolyte as disclosed in U.S. applications Ser. No. 973,552 and No. 973,554.

Another object of the present invention is to provide a cathode consisting of a mixture of manganese dioxide and a metal fluoride in a mole ratio of between about 1:2.5 and about 3:1.

The foregoing and additional objects will become more fully apparent from the following description.

SUMMARY OF THE INVENTION

The invention relates to a cathode for use in an electrochemical cell comprising a mixture of manganese dioxide ($MnO_2$) having a water content of between about 1.0 and about 25 weight percent with at least one metal fluoride in a mole ratio of between about 1:2.5 and about 3:1, preferably about 1:1. The metal fluoride can be selected from the group consisting of cobaltic trifluoride ($CoF_3$), lead trifluoride ($PbF_3$) manganese trifluoride ($MnF_3$), tantalum pentafluoride ($TaF_5$), niobium pentafluoride ($NbF_5$), mercuric fluoride ($HgF_2$), mercurous fluoride ($Hg_2F_2$), cupric fluoride ($CuF_2$), argentous fluoride ($AgF$), argentic fluoride ($AgF_2$) and bismuth trifluoride ($BiF_3$). The preferred metal fluorides are cobaltic trifluoride, manganese trifluoride, argentic fluoride and mercuric fluoride, with the most preferable being cobaltic trifluoride and manganese trifluoride.

It was unexpectedly found that when a water-containing manganese dioxide was mixed with a metal fluoride such as cobaltic trifluoride and then used as a cathode in a cell employing a lead anode, a solid electrolyte of $88PbF_2$-$8SrF_2$-$4KF$, the open circuit voltage was higher than the open circuit voltage using either manganese dioxide or the metal fluoride as the cathode in the cell system. Although not wanting to be bound by theory, a possible explanation of the synergistic effect of using manganese dioxide together with the metal fluoride is that the water in the manganese dioxide ($MnO_2$) reacts with the metal fluoride such as manganese trifluoride to produce hydrogen fluoride (HF) as follows:

$$2MnF_3 + 3H_2O \rightarrow 6HF + Mn_2O_3.$$

Hydrogen fluoride is then believed to take part in the overall cell reaction as follows:

$$\underset{\text{(Anode)}}{Pb} + \underset{\text{(Cathode)}}{MnO_2} + 4HF \rightarrow MNF_2 + PbF_2 + 2H_2O$$

The amount of water in the manganese dioxide* for use in the cathodes of this invention should be between about 1.0 and about 25 weight percent and preferably between about 3.0 and about 10 weight percent. A water content of less than 1.0 weight percent would not provide sufficient hydrogen fluoride for the cell reaction and an amount above 25 weight percent would provide excessive water that would be electrochemically detrimental to the other components of the cell such as the solid electrolyte. It is also within the scope of this invention to incorporate a lead fluoride-based solid electrolyte into the cathode.

*Determined by weight loss on heating 2 hours at 400° C.

The cathode of this invention could be used with fluoride ion-conducting solid electrolytes, preferably $PbF_2$-based solid electrolytes. Examples of solid electrolytes for use in conjunction with the cathodes of this invention are as follows:

| Mixture Composition (Molar Proportions) | Specific Resistivity (ohm-cm) at Room Temp. |
|---|---|
| $86PbF_2$—$10CaF_2$—$4KF$ | 1578 |
| $81PbF_2$—$15CaF_2$—$4KF$ | 2750 |
| $76PbF_2$—$20CaF_2$—$4KF$ | 2200 |
| $71PbF_2$—$25CaF_2$—$4KF$ | 2500 |
| $66PbF_2$—$35CaF_2$—$4KF$ | 1730 |
| $61PbF_2$—$35CaF_2$—$4KF$ | 1800 |
| $79PbF_2$—$6KF$—$15SrF_2$ | 10778 |
| $77PbF_2$—$8KF$—$15SrF_2$ | 1736 |
| $75PbF_2$—$10KF$—$15SrF_2$ | 3000 |
| $86PbF_2$—$10BaF_2$—$4KF$ | 1100 |
| $81PbF_2$—$15BaF_2$—$4KF$ | 2800 |
| $76PbF_2$—$20BaF_2$—$4KF$ | 4400 |
| $71PbF_2$—$25BaF_2$—$4KF$ | 14000 |
| $66PbF_2$—$30BaF_2$—$4KF$ | 113000 |
| $61PbF_2$—$35BaF_2$—$4KF$ | 132000 |
| $56PbF_2$—$40BaF_2$—$4KF$ | 483000 |
| $86PbF_2$—$10SrF_2$—$4RbF$ | 2660 |
| $86PbF_2$—$10SrF_2$—$4KF$ | 1477 |
| $81PbF_2$—$15SrF_2$—$4KF$ | 2413 |
| $76PbF_2$—$20SrF_2$—$4KF$ | 3544 |
| $71PbF_2$—$25SrF_2$—$4KF$ | 9310 |
| $66PbF_2$—$30SrF_2$—$4KF$ | 26000 |
| $61PbF_2$—$35SrF_2$—$4KF$ | 70000 |
| $56PbF_2$—$40SrF_2$—$4KF$ | 269000 |
| $88PbF_2$—$8SrF_2$—$4LiF$ | 380000 |
| $88PbF_2$—$8SrF_2$—$4RbCl$ | 4100 |
| $76PbF_2$—$20CaF_2$—$4RbF$ | 5200 |
| $76PbF_2$—$20BaF_2$—$4RbF$ | 6500 |
| $81PbF_2$—$15SrF_2$—$4KBr$ | 5200 |
| $81PbF_2$—$15SrF_2$—$4K_2CO_3$ | 7100 |
| $81PbF_2$—$15SrF_2$—$4K_2SO_4$ | 8500 |
| $76PbF_2$—$20SrF_2$—$4KBr$ | 7500 |
| $76PbF_2$—$20SrF_2$—$4K_2CO_3$ | 9800 |
| $76PbF_2$—$20SrF_2$—$4K_2SO_4$ | 18400 |
| $96PbF_2$—$2CaF_2$—$2KF$ | 1326 |
| $94PbF_2$—$3CaF_2$—$3KF$ | 827 |
| $95PbF_2$—$2CaF_2$—$3KF$ | 766 |
| $94PbF_2$—$2CaF_2$—$4KF$ | 642 |
| $95PbF_2$—$3CaF_2$—$2KF$ | 1134 |
| $94PbF_2$—$1CaF_2$—$5RbCl$ | 3450 |
| $96PbF_2$—$2MgF_2$—$2KF$ | 3630 |
| $94PbF_2$—$1MgF_2$—$5KF$ | 2430 |
| $94PbF_2$—$2MgF_2$—$4KF$ | 1108 |
| $96PbF_2$—$2MgF_2$—$2K_2CO_3$ | 4400 |
| $94PbF_2$—$1MgF_2$—$5K_2CO_3$ | 1047 |
| $94PbF_2$—$1MgF_2$—$4K_2CO_3$ | 1161 |
| $88PbF_2$—$8MgF_2$—$4KF$ | 26400 |
| $86PbF_2$—$10MgF_2$—$4KF$ | 21900 |
| $76PbF_2$—$20MgF_2$—$4KF$ | 40200 |
| $88PbF_2$—$8SrF_2$—$4NaF$ | 20000 |
| $88PbF_2$—$8SrF_2$—$4RbF$ | 5700 |
| $88PbF_2$—$8SrF_2$—$4CsF$ | 63000 |
| $90PbF_2$—$5SrF_2$—$5KF$ | 848 |
| $88PbF_2$—$8SrF_2$—$2K_2CO_3$ | 1970 |
| $90PbF_2$—$8SrF_2$—$2K_2CO_3$ | 1202 |
| $86PbF_2$—$10CaF_2$—$2K_2CO_3$ | 1815 |
| $86PbF_2$—$10SrF_2$—$2K_2CO_3$ | 1405 |
| $96PbF_2$—$2Sr(NO_3)2$—$2KNO_3$ | 1078 |
| $86PbF_2$—$10Sr(NO_3)2$—$4KNO_3$ | 8290 |
| $86PbF_2$—$10SrF_2$—$4KNO_3$ | 1450 |
| *$88PbF_2$—$8SrF_2$—$4KF$ | 857 |
| $90PbF_2$—$6SrF_2$—$4KF$ | 1034 |
| $94.5PbF_2$—$0.5CaSO_4$—$5.0KF$ | 1136 |
| $94.5PbF_2$—$0.5CaSO_4$—$5.0K_2CO_3$ | 1164 |
| $88PbF_2$—$8SrF_2$—$4K_2SO_4$ | 5700 |
| $88PbF_2$—$8SrF_2$—$4KNO_3$ | 1900 |
| $88PbF_2$—$8SrF_2$—$4KCl$ | 20000 |
| $88PbF_2$—$8SrF_2$—$4KBr$ | 2500 |
| $88PbF_2$—$8SrF_2$—$4K_2CO_3$ | 1700 |
| $88PbF_2$—$8BaF_2$—$4KF$ | 1050 |
| $88PbF_2$—$8BaF_2$—$4K_2SO_4$ | 5900 |
| $88PbF_2$—$4CaF_2$—$4SrF_2$—$4KF$ | 4000 |
| $88PbF_2$—$4CaF_2$—$4SrF_2$—$4K_2SO_4$ | 15600 |
| $50PbF_2$—$50SnF_2$ | 1000 |

*The ionically conducting product formed from this ternary mixture was analyzed and found to contain the following: 78.63 wt. percent lead, 3.07 wt. percent strontium, 15.97 wt. percent fluorine and 0.60 wt. percent potassium.

Additional solid state electrolytes for use in conjunction with the cathode of this invention would include the ionically conductive product of a binary mixture of lead fluoride ($PbF_2$) and a range of between about 0.1 and about 15.0 mole percent of cesium fluoride or a metal salt having a cation component selected from the group consisting of sodium (Na), potassium (K), rubidium (Rb) and cesium (Cs) and an anion component selected from the group consisting of chloride, bromide, iodide, cyanide, nitrate, hydroxide, thiocyanate, carbonate, phosphate, sulfate, oxide, formate, acetate and oxalate.

The preferred solid electrolytes for use in conjunction with the cathodes of this invention are $88PbF_2$-$8SrF_2$-$4KF$, $86PbF_2$-$10BaF_2$-$4KF$, $94PbF_2$-$3CaF_2$-$3KF$, $95PbF_2$-$2CaF_2$-$3KF$, $95PbF_2$-$5KF$ and $50PbF_2$-$50SnF_2$.

Suitable anodes for use in conjunction with the cathode of this invention are lead, lead-coated substrates, alloys of lead and metals more noble than lead.

EXAMPLE I

A 100 milligram mixture of cobalt trifluoride and water-containing manganese dioxide in a 1:1 mole ratio was made and then assembled along with a solid electrolyte $88PbF_2$-$8SrF_2$-$4KF$ and a lead disc (anode) to produce a solid electrolyte cell. The initial open circuit voltage of the cell so produced was 1.71 volts which slowly rose to 1.94 volts. The cell was then discharged across a 500-kilohm resistor for fifteen days at which time the voltage recorded was approximately 1 volt. The cell impedance measured during the fifteen day period varied between 3500 and 5930 ohms.

EXAMPLE II

A 100 milligram mixture of cobalt trifluoride and water-containing manganese dioxide in a 1:1 mole ratio was made and then assembled along with a solid electrolyte $PbSnF_4$ and a lead disc (anode) to produce a solid electrolyte cell. The initial open circuit voltage of the cell was 1.53 volts which slowly rose to 1.83 volts. The cell was discharged across a 500-kilohm resistor for fourteen days at which time the voltage recorded was approximately 1.2 volts. The cell impedance measured during the fourteen day period varied between 1742 and 5270 ohms.

EXAMPLE III

A 100 milligram mixture of manganese trifluoride and water-containing manganese dioxide in a 1:1 mole ratio was made and then assembled along with a solid electrolyte $PbSnF_4$ and a lead disc (anode) to produce a solid electrolyte cell. The initial open circuit voltage of the cell was 1.38 volts which slowly rose to 1.45 volts. The cell was discharged across a 500-kilohm resistor for eight days at which time the voltage recorded was 0.56 volt. The cell impedance measured during the eight day period varied between 1995 and 3220 ohms.

EXAMPLE IV

A 100 milligram mixture of cobalt trifluoride and water-containing manganese dioxide in a 1:2 mole ratio was made and then assembled along with a solid electrolyte $PbSnF_4$ and a lead disc (anode) to produce a solid electrolyte cell. The initial open circuit voltage of the cell was 1.54 volts which slowly rose to 1.63 volts. The cell was discharged across a 500-kilohm resistor for twelve days at which time the voltage recorded 0.3 volt. The cell impedance measured during the twelve day period varied between 271 and 375 ohms.

It should be understood that the foregoing disclosure relates to preferred embodiments of the invention and it is intended to cover all changes and modifications of the invention which do not depart from the spirit and scope of the appended claims.

What is claimed is:

1. A cathode for use in an electrochemical cell comprising a mixture of manganese dioxide ($MnO_2$) having a water content of between about 1.0 and about 25 percent by weight with a metal fluoride in a mole ratio of between about 1:2.5 and about 3:1.

2. The cathode of claim 1 wherein the mole ratio is about 1:1.

3. The cathode of claim 1 wherein the manganese dioxide has a water content of between about 3 and about 10 percent by weight.

4. The cathode of claim 1 wherein the metal fluoride is selected from the group consisting of cobaltic trifluoride ($CoF_3$), lead trifluoride ($PbF_3$), manganese trifluoride ($MnF_3$), tantalum pentafluoride ($TaF_5$), niobium pentafluoride ($NbF_5$), mercuric fluoride ($HgF_2$), mercurous fluoride ($Hg_2F_2$), cupric fluoride ($CuF_2$), argentous fluoride ($AgF$), argentic fluoride ($AgF_2$) and bismuth trifluoride ($BiF_3$).

5. A solid electrolyte cell employing the cathode of claim 1.

6. The solid electrolyte cell of claim 5 employing a lead fluoride-based solid electrolyte.

7. The solid electrolyte cell of claim 6 wherein a portion of the lead fluoride-based solid electrolyte is incorporated into the cathode.

8. The solid electrolyte cell of claim 5 employing a solid electrolyte selected from the group consisting of $88PbF_2$-$8SrF_2$-$4KF$, $86PbF_2$-$10BaF_2$-$4KF$, $94PbF_2$-$3CaF_2$-$3KF$, $95PbF_2$-$2CaF_2$-$3KF$, $50PbF_2$-$50SnF_2$ and $90PbF_2$-$5SnF_2$-$5KF$ and an anode selected from the group consisting of lead, lead-coated substrates and lead alloys.

9. The solid electrolyte cell of claim 8 wherein a lead fluoride-based solid electrolyte is incorporated into the cathode.

10. The solid electrolyte cell of claim 5 employing a $88PbF_2$-$8SrF_2$-$4KF$ solid electrolyte and a lead anode.

11. The solid electrolyte cell of claim 5 employing a $50PbF_2$-$50SnF_2$ solid electrolyte and a lead anode.

12. The solid electrolyte cell of claim 5 employing a $86PbF_2$-$10BaF_2$-$4KF$ solid electrolyte and a lead anode.

13. The solid electrolyte cell of claim 5 employing a $94PbF_2$-$3CaF_2$-$3KF$ solid electrolyte and a lead anode.

* * * * *